(12) United States Patent
Milenova et al.

(10) Patent No.: US 9,471,545 B2
(45) Date of Patent: Oct. 18, 2016

(54) APPROXIMATING VALUE DENSITIES

(71) Applicant: Oracle International Corporation, Redwood Shores, CA (US)

(72) Inventors: Boriana Lubomirova Milenova, Reading, MA (US); Marcos M Campos, La Jolla, CA (US); Joseph Yarmus, Groton, MA (US)

(73) Assignee: Oracle International Corporation, Redwood Shores, CA (US)

( * ) Notice: Subject to any disclaimer, the term of this patent is extended or adjusted under 35 U.S.C. 154(b) by 665 days.

(21) Appl. No.: 13/764,677

(22) Filed: Feb. 11, 2013

(65) Prior Publication Data

US 2014/0229147 A1 Aug. 14, 2014

(51) Int. Cl.
*G06F 7/60* (2006.01)
*G06F 17/10* (2006.01)
*G06F 17/18* (2006.01)

(52) U.S. Cl.
CPC .................... *G06F 17/18* (2013.01)

(58) Field of Classification Search
CPC ........... G06F 17/5018; G06F 17/5036; G06F 17/5009; G06F 2217/16; G05B 17/02
USPC ............................................................ 703/2
See application file for complete search history.

(56) References Cited

U.S. PATENT DOCUMENTS

| 5,761,653 | A | 6/1998 | Schiefer et al. |
| 5,857,180 | A | 1/1999 | Hallmark et al. |
| 6,041,357 | A | 3/2000 | Kunzelman et al. |
| 6,092,062 | A | 7/2000 | Lohman et al. |
| 6,353,818 | B1 | 3/2002 | Carino, Jr. |
| 6,353,826 | B1 | 3/2002 | Seputis |
| 6,356,889 | B1 | 3/2002 | Lohaman et al. |
| 6,493,637 | B1 | 12/2002 | Steeg |
| 6,618,719 | B1 | 9/2003 | Andrei |
| 7,167,848 | B2 | 1/2007 | Boukouvalas et al. |
| 7,480,663 | B2 | 1/2009 | Colossi et al. |
| 7,647,293 | B2 | 1/2010 | Brown et al. |
| 7,877,381 | B2 | 1/2011 | Ewen et al. |
| 8,818,991 | B2 | 8/2014 | Hagenbuch et al. |

(Continued)

OTHER PUBLICATIONS

Sean Borman, "The Expectation Maximization Algorithm A Short Tutorial", 9 pages Jul. 18, 2004.

(Continued)

*Primary Examiner* — Saif Alhija
(74) *Attorney, Agent, or Firm* — Hickman Palermo Becker Bingham LLP

(57) ABSTRACT

Processes, machines, and stored machine instructions are provided for approximating value densities in data. While generating a resulting density model to approximate value densities in a set of data, density modeling logic selects a functional component of a first model to vary based at least in part on how much the functional component contributes to how well the first model approximates the value densities. The density modeling logic then uses at least the functional component and a variation of the functional component as seed components to determine adjusted functional components of a second model by iteratively determining, in an expectation step, how much the seed components contribute to how well the second model explains the values, and, in a maximization step, new seed components, optionally to be used in further iterations, based at least in part on how much of the values are attributable to the seed components.

26 Claims, 3 Drawing Sheets

(56) References Cited

U.S. PATENT DOCUMENTS

| | | |
|---|---|---|
| 2003/0065648 A1 | 4/2003 | Driesch et al. |
| 2005/0038848 A1 | 2/2005 | Kaluskar et al. |
| 2005/0102325 A1 | 5/2005 | Gould et al. |
| 2005/0278355 A1 | 12/2005 | Gonzalez |
| 2006/0036617 A1 | 2/2006 | Bastawala et al. |
| 2008/0098048 A1 | 4/2008 | Cao et al. |
| 2008/0133454 A1 | 6/2008 | Markl et al. |
| 2011/0153623 A1 | 6/2011 | Vo |
| 2012/0310874 A1 | 12/2012 | Dantressangle et al. |
| 2014/0229482 A1 | 8/2014 | Milenova et al. |

OTHER PUBLICATIONS

Frank Dellaert, "The Expectation Maximization Algorithm", College of Computing < Georgia Institute of Technology, 7 pages, Feb. 2002.

Chuong B Do & Serafim Batzoglou, "What is the expectation maximation algorithm?", Nature Biology, 3 pages, vol. 26, No. 8, Aug. 2008.

Daniel Lows, Pedro Domingos "Naive Bayes Models for Probability Estimation" Department of Computer Science and Engineering, University of Washington, 8 pages.

Naonori Ueda, "SMEN Algotithm for Mixture Models" NTT Communication Science Laboratories, 24 pages.

Tatti, Nikolaj, "Maximum Entropy Based Significance of Itemsets", ICDM dated 2007, Omaha, NE, dated Oct. 28-31, 2007, pp. 312-321.

Merriam-Webster's Collegiate Dictionary, 10th Edition, Springfield, MA, dated 1997, pp. 308-309 and 918.

Li, Quanzhong, et al., "Adaptively Reordering Joins during Query Execution", ICDE dated 2007, Istanbul, Turkey, dated Apr. 15-20, 2007, pp. 26-35.

Iiyas, Ihab F., et al., "CORDS: Automatic Discovery of Correlations and soft Functional Dependencies", SIGMOD dated 2004, Paris, France, Jun. 13-18, 2004, pp. 647-658.

Fan, Wenfei, et al., "Discovering Conditional Functional Dependencies", IEEE Transactions on Knowledge and Data Engineering, vol. 23, No. 5, dated May 2011, pp. 683-698.

Cimiano, Philipp, "Chapter 6: Concept Hierarchy Induction", Ontology Learning and Population from Text: Algorithms. Evaluation and Applications, Springer, dated 2006, pp. 85-184.

Antoshenkov et al., "Query Processing in Oracle Rdb", The VLDB Journal, vol. 5, Issue 4, dated Dec. 1996, pp. 229-237.

Aboulnaga, A. et al., "Autpmated Statistics Collection in DB2 UDB", Proc. of the 30th VLDB Conf. Toronto, Canada, dated 2004, pp. 1158-1169.

U.S. Appl. No. 13/764,621, filed Feb. 11, 2013, Office Action, Oct. 3, 2014.

U.S. Appl. No. 11/764,658, filed Feb. 11, 2013, Office Action, Aug. 26, 2014.

U.S. Appl. No. 13/764,658, filed Feb. 11, 2013, Advisory Action, Apr. 15, 2015.

U.S. Appl. No. 13/764,658, filed Feb. 11, 2013, Interview Summary, Mar. 18, 2015.

U.S. Appl. No. 13/764,658, filed Feb. 11, 2013, Interview Summary, Apr. 1, 2015.

U.S. Appl. No. 13/764,621, filed Feb. 11, 2013, Notice of Allowance, Apr. 10, 2015.

U.S. Appl. No. 13/764,658, filed Feb. 11, 2013, Final Office Action, Jan. 22, 2015.

U.S. Appl. No. 13/764,658, filed Feb. 11, 2013, Notice of Allowance, May 22, 2015.

APPROXIMATING VALUE DENSITIES

CROSS-REFERENCE TO RELATED APPLICATIONS

This application is related to the patent application Ser. No. 13/764,621, issued as U.S. Pat. No. 9,110,949, also filed on Feb. 11, 2013, the entire contents of which is hereby incorporated by reference as if fully set forth herein. This application is also related to the patent application Ser. No. 13/764,658, issued as U.S. Pat. No. 9,135,280, also filed on Feb. 11, 2013, the entire contents of which is hereby incorporated by reference as if fully set forth herein.

FIELD OF THE INVENTION

The present invention relates to approximating value densities in data.

BACKGROUND

Many businesses live or die based on the efficiency and accuracy by which they can store, retrieve, process, and/or analyze data. "Data," as used herein, is digital information that is electronically stored on storage device(s). Data may be maintained on an individual storage device, such as a local hard disk or solid state drive, a CD-ROM, or a memory module. Alternatively, data may be distributed over multiple storage devices, such as storage devices that are working together to provide a cloud storage service or storage devices that are operating separately to store subsets of the data. One or more database servers may operate in parallel to provide read and/or write access to the data. Large sets of data, whether stored on one device or distributed among many devices, may consume a significant amount of storage space and/or processor time to store, retrieve, process, and/or analyze.

Data may be described in terms of fields and values. "Fields," as used herein, refer to containers or labels that provide contexts. "Values," as used herein, refer to information that is stored according to or in association with the contexts. For example, a single table may have many different columns that provide contexts for the values that are stored in the columns. The different columns may store different sets of data having different contexts, and the different sets of data may or may not be of different data types. In another example, a single document may have many attributes and/or elements that provide contexts for the values that are nested in the attributes and/or elements. Elements or attributes that share the same name, path, or other context may collectively store a set of data that shares the context. Different elements or attributes may store different sets of data having different contexts, and the different sets of data may or may not be of different data types.

To alleviate some of the overhead for storing, retrieving, processing, and/or analyzing large sets of data, some computer systems utilize metadata that is created and stored in association with the sets of data. "Metadata," as used herein, is data that describes other data. Metadata may describe data in a manner that allows the described data to be stored, retrieved, processed, and/or analyzed more efficiently or more accurately. For example, metadata for a given set of data may include a mean, median, mode, minimum, and/or maximum of the given set of data, such that these value(s) may be quickly retrieved without being recalculated each time the set of data is accessed. The metadata may be used to plan for data processing such that a data processor can effectively allocate resources for the data processing.

General statistics such as the mean, median, mode, minimum, or maximum value(s) may be helpful when storing, retrieving, processing, and/or analyzing a set of data. However, these general statistics are not always helpful for predicting whether a non-uniform set of data has specific values.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
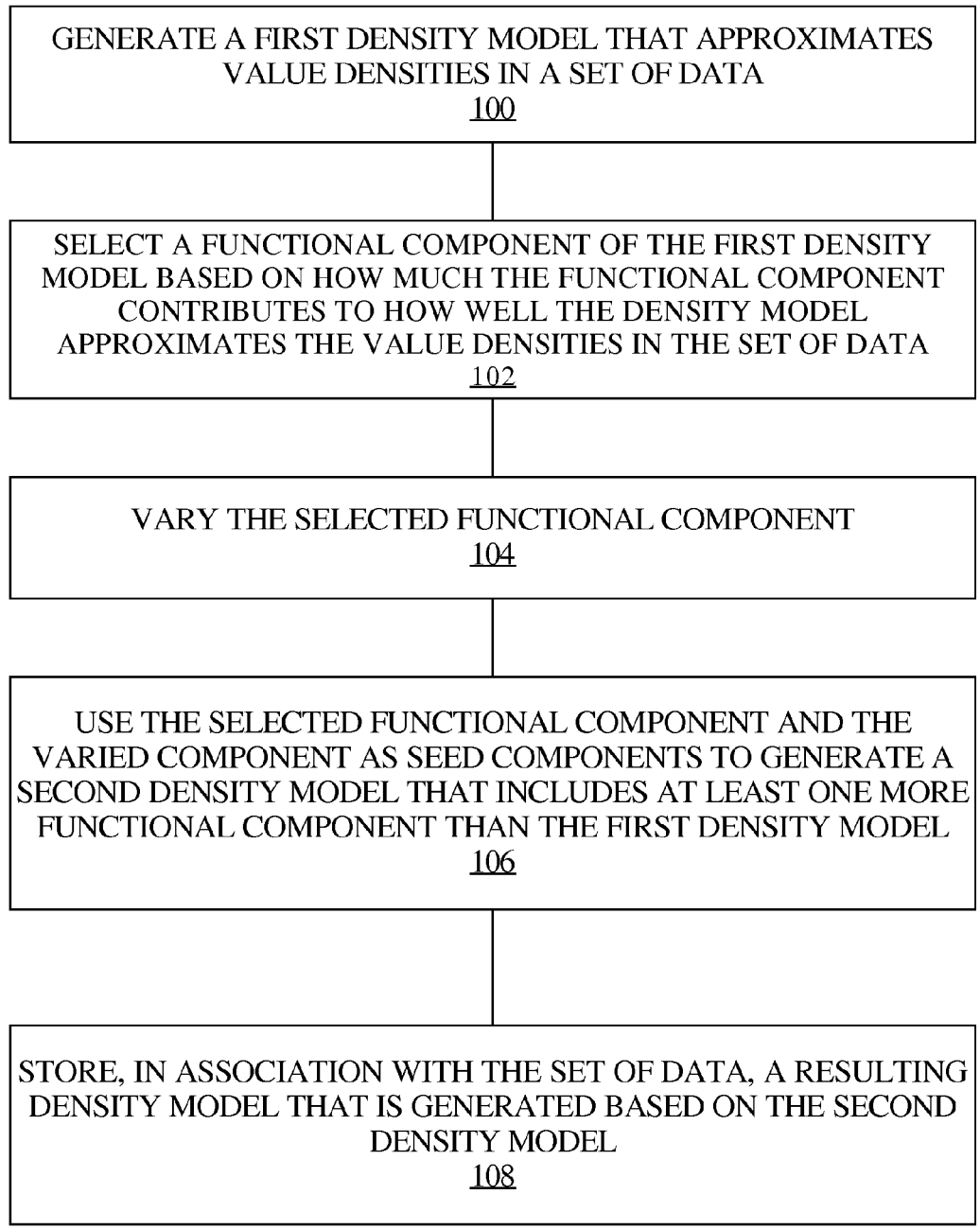
FIG. 1 illustrates an example process for generating a new density model by varying a component of an existing density model.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Various example machine-implemented methods, specially configured machines, and stored machine instructions are provided herein for approximating value densities in data. Machines may be specially configured with logic comprising a combination of stored instructions, hard-wired instructions, and hardware including a processor for performing processes that include approximating value densities in data. Density modeling logic operating on computing device(s) generates density models to approximate the value densities. While generating a resulting density model to approximate the value densities, in a component selection phase, the density modeling logic selects a functional component of a first model to vary based at least in part on how much the functional component contributes to how well the first model approximates the value densities. For example, the functional component may be selected based at least in part on how much the functional component contributes to a likelihood or log likelihood that the values are explained by the first model.

After adding a variation of the selected functional component to the first model in the component selection phase, the density modeling logic uses at least the selected functional component and the variation as seed components in an optimization phase that determines adjusted functional components of a second model by iteratively determining, in an expectation step of the optimization phase, how much the seed components contribute to how well the second model explains the values, and, in a maximization step of the optimization phase, updated seed components, optionally to be used in further iterations of the optimization phase, based at least in part on how much of the values are attributable to the seed components. The expectation step may include determining how much the seed components contribute to a likelihood or log likelihood that the values are explained by the second model. The expectation step and maximization step may be iteratively performed multiple times in the optimization phase until the second model of functional components is determined.

After the optimization phase, in a model evaluation phase, the density modeling logic may evaluate the second model and determine whether or not to add additional functional components to the second model in an additional component selection phase or to keep the second model or the first model as a final model. If an additional component is added, the additional component selection phase is followed by an additional optimization phase and an additional model evaluation phase. The process may continue iteratively until a resulting model from an additional optimization phase is retained as the final model.

The density modeling logic may determine whether or not to add more components or vary the selected component based at least in part on whether the likelihood or log likelihood that the values are explained by the second model is at least a threshold amount better than the likelihood or log likelihood that the values are explained by the first model. If varying a selected functional component does not provide a significantly better likelihood or log likelihood, then other functional components of the first model may be selected to vary. Up to a threshold number of other functional components of the first model may be selected to vary. If none of the threshold number of other functional components improve the likelihood or log likelihood of the second model significantly beyond that of the first model, then the first model or any of the second models may be used as the final model that represents the set of data. In one embodiment, if multiple models are similar in the quality that they approximate the set of data, the smallest of the similar models is retained as the final model.

When evaluating how much the seed components contribute to a likelihood or log likelihood that the values are explained by the second model, the likelihood or log likelihood may be evaluated relative how much other functional components contribute to the likelihood or log likelihood that the values are explained by the second model. For example, the likelihood or log likelihood that the values are explained by a component of the second model may be evaluated and compared with likelihoods that the values are explained by other components of the second model with the assumption that the values are explained by the second model.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

FIG. 1 illustrates an example process for generating a new density model by varying a component of an existing density model. The example steps may be performed by density modeling logic operated on computing device(s). In step 100, the density modeling logic generates a first density model that approximates value densities in a set of data. In step 102, the density modeling logic selects a functional component of the first density model based on how much the functional component contributes to how well the density model approximates the value densities in the set of data. The density modeling logic then varies the selected functional component in step 104, and, in step 106, the density modeling logic uses the selected functional component and the varied component as seed components to generate a second density model that includes at least one more functional component than the first density model. A resulting density model that is generated based on the second density model is stored, in step 108, in association with the set of data.

Figure 2:
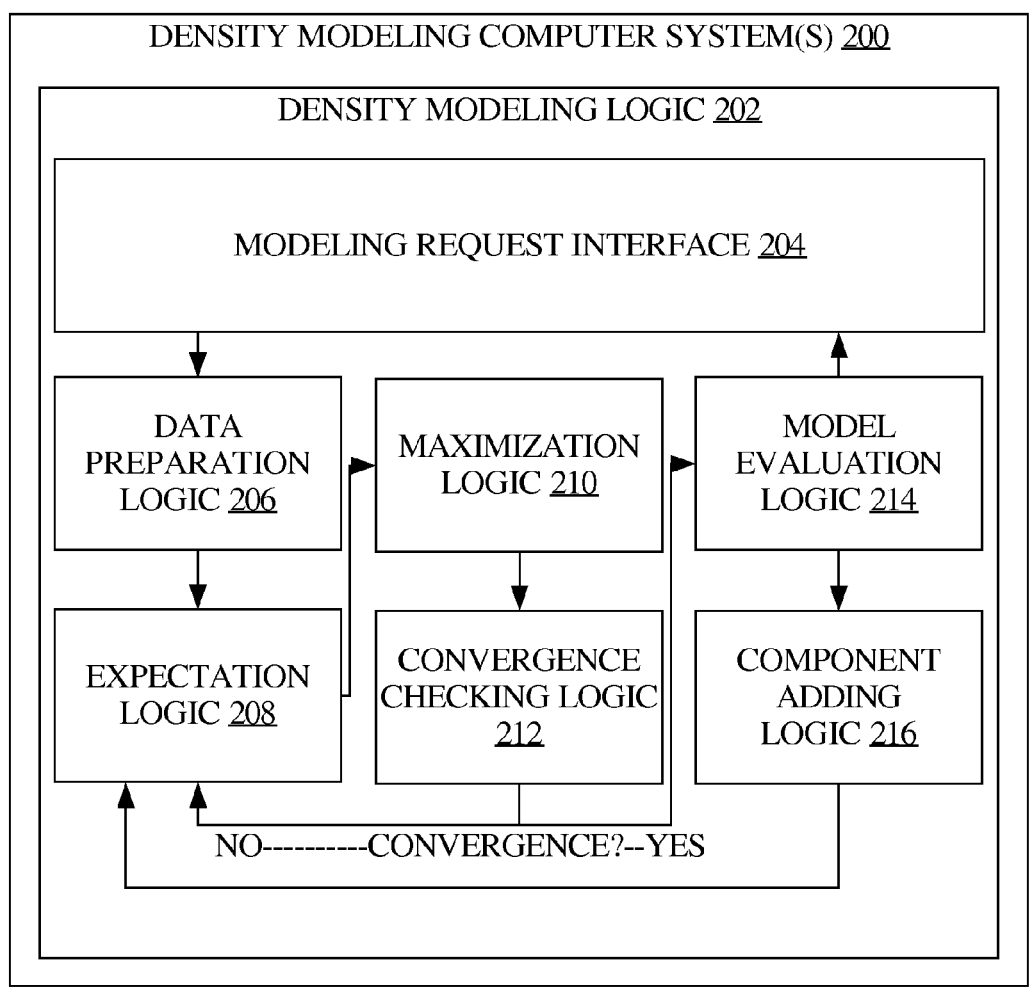
FIG. 2 illustrates an example system for generating density models for datasets.

FIG. 2 illustrates an example system for generating density models for datasets. As shown, density modeling computer system(s) 200 include density modeling logic 202. Density modeling logic 202 includes a modeling request interface 204 for receiving requests for new density models to represent sets of data. Density modeling logic 202 also includes data preparation logic for preparing the sets of data to be modeled. Expectation logic 208 and maximization logic 210 function to generate adjusted component values based on seed component value(s) that represent the data. Convergence checking logic 212 checks to see whether the expectation maximization routine has converged to stable adjusted components. If not, convergence checking logic 212 triggers a further iteration of the expectation maximization routine.

If the expectation maximization routine has converged to stable adjusted components, convergence checking logic 212 sends an adjusted model to model evaluation logic 214. Model evaluation logic 214 may return the adjusted model as a resulting model to modeling request interface 204 if the adjusted model has a maximum number of components. Model evaluation logic 214 may also return a resulting model if the adjusted model does not represent a set of data significantly better than a previous model analyzed by model evaluation logic 214. Model evaluation logic 214 may cause a component to be added by component adding logic 216 if the adjusted model represents the set of data significantly better than the previous model but does not yet have the maximum number of components. Component adding logic 216 varies a weakest component of the adjusted model and causes at least the varied component to be a seed value for a further expectation maximization routine. A resulting model of a set of data may be returned by modeling request interface 204 in response to an initial request to model the set of data.

Generating a Density Model by Varying a Component

In one embodiment, density modeling logic on one or more computing devices generates an initial density model to approximate a set of data. The set of data may be raw data that includes numerical values or may be a binned representation of a raw set of data if the raw data includes non-numerical values. The initial density model may include one or a few components that may be randomly selected or selected based on statistics such as the mean, median, and/or mode of the data. The density modeling logic selects a functional component to vary based at least in part on how well the first set of functional components approximates the value densities in the set of data. The approximation by the first set of functional components may be evaluated based at least in part on a likelihood or log likelihood that at least part of the set of data is explained by the first set of functional components.

In one embodiment, the density modeling logic generates a first density model that approximates value densities in a set of data. The first density model may or may not be the initial density model and may or may not include more than one component. The density modeling logic then selects a first functional component of the first set of functional components based at least in part on how much the first functional component contributes to how well the first set of functional components approximates the value densities in the set of data. The selected functional component may then be varied and used to generate a second density model, and the second density model may better approximate value densities in the set of data and may be used to generate other density models that may better approximate value densities in the set of data.

The components may include any functions that may be defined by variable parameters and that may describe distributions of values. For example, continuous functions such as gaussian distribution functions may be used to model continuous data distributions. As another example, discrete functions such as multinomial distribution functions may be used to model discrete data distributions. In one example, the selected functional component is a Gaussian distribution or bell curve centered at a specified value, such as a mean value of the given distribution of values. The specified value may be stored to define the bell curve. The bell curve may also be defined according to a specified width or variance of the bell curve and/or a specified height or magnitude of the bell curve, if the bell curve is not normalized. The variation of the Gaussian distribution may be generated by varying the location/means of the first functional component in a direction of maximum variance. In another example, the selected functional component is a multinomial distribution having one or more frequencies, and a variation of the multinomial distribution may be generated by varying the one or more frequencies.

The density modeling logic generates the second density model comprising a second set of functional components that includes at least one more functional component than the first set of functional components. The second set of functional components is determined using at least the first functional component and a variation of the first functional component as seed components. The second density model may then be treated as a first density model, and the density modeling logic may iteratively add components to the models by selecting a component to vary and generating a new model by using at least the selected component and the variation as seed components. When a satisfactory resulting density model has been generated according to these steps, the density modeling logic may store the resulting density model in association with the set of data. The resulting density model may then be accessed to make predictions about the set of data without scanning every data value in the set of data.

In one embodiment, the seed components used for producing a new density model also include, in addition to the selected component and the variation of the selected component, other component(s) that are in a same neighborhood as the selected component. For example, the other component(s) may be within a threshold distance of the selected component, or within a distance that is based on the statistical variance of the selected component. In a particular example, other components that are within twice the variance of the selected component may be defined as being in the same neighborhood. In other examples, the distance between components may be quantified based on any function of the difference between value distributions defined by the components.

Regardless of whether or not the seed components include other components that are in the same neighborhood as the selected component, the density modeling logic may determine a second set of functional components for a new model at least in part by determining adjusted functional components of the second model. The adjusted components are determined by, in an expectation step, determining relative probabilities that the seed components contribute to how well the second model approximates the value distributions, and, in a maximization step, optimizing the seed components by determining replacement seed components based at least in part on the relative probabilities for the corresponding seed components.

Iteratively Varying Components to Reach a Resulting Model

The density modeling logic may select other functional component(s) to vary if varying the selected functional component does not result in a satisfactory model. In one embodiment, the density modeling logic determines an amount of improvement that indicates how much better the second density model approximates value densities in the set of data than the first density model approximates the value densities in the set of data. If the density modeling logic determines that the amount of improvement does not satisfy a threshold amount of improvement, the density modeling logic may select a second, different, functional component of the first set of functional components. The density modeling logic then uses the second functional component and a variation of the second functional component as seed components to generate a third density model. The third density model includes a third set of functional components that has at least one more functional component than the first set of functional components. The resulting density model to approximate the set of data may be the third density model or may be otherwise based at least in part on the third density model. For example, the resulting density model may include additional functional component(s) that were added as a result of varying functional component(s) of the third model.

In another embodiment, if the amount of improvement does not satisfy the threshold, the density modeling logic may, at some point optionally after attempting to vary other component(s), stop attempting to improve the approximation of the value densities. Such further attempts may be wasteful of resources if the amount of improvement does not satisfy the threshold. In this embodiment, the density modeling logic may retain the first density model or the second density model as the resulting density model. In one embodiment, if multiple models are similar in the quality that they approximate the set of data, the smallest of the similar models is retained as the final model. Larger models may be a result of overfitting.

On the other hand, if the amount of improvement does satisfy the threshold, the density modeling logic may attempt to generate an even better approximation of the value densities by selecting a second functional component of the second set of functional components to vary. The second functional component may be selected based at least in part on how much the second functional component contributes to how well the second set of functional components approximates the value densities in the set of data. The density modeling logic uses at least the second functional component and a variation of the second functional component as seed components to generate a third density model. The third density model includes a third set of functional components that includes at least one more functional component than the second set of functional components. The resulting density model that represents the set of data may be the third density model or may be based at least in part on the third density model.

The density modeling logic may continue to attempt to improve the model by adding functional components until either a satisfactory model is reached, further attempts result in insignificant amounts of improvement, or a maximum number of components is reached. At each iteration of determining whether to add a functional component, the density modeling logic may determine whether a number of components in the current density model is a threshold number of components allowed for the resulting density model. The density modeling logic may continue to add components as long as the number of components is less than the threshold number of components allowed. The components to vary at each iteration may be selected based at least in part on how much each respective functional component contribute to how well the set of functional components (including the respective functional component) approximates the value densities in the set of data. At each iteration, at least the selected components and variations of the selected components may be used to generate new density models that include more components than the previous density model. The resulting density model may be determined when an iteration produces a satisfactory model, when further attempts to improve the models result in insignificant amounts of improvement, or when a maximum number of components is reached. When the maximum number of components is reached, the model that has the maximum number of components may be retained as the resulting density model.

An iteration may be determined to have produced a satisfactory model when a degree of accuracy by which the model approximates value densities satisfies a threshold degree of accuracy. The degree of accuracy may be determined by comparing the model to one or multiple samples of the set of data, for example, by computing whether a likelihood or a log likelihood that the data is represented by the model is greater than a threshold. In another embodiment, the threshold is a relative improvement in the likelihood or log likelihood. The relative improvement may be judged against previous models generated in previous iterations of a model generation process that includes selecting component(s) to vary, optimizing the components to generate a model, and evaluating the generated model. Upon determining that the degree of accuracy of the model satisfies the threshold, the density modeling logic may retain the model as the resulting density model. The threshold for determining a satisfactory model to retain may be different than the threshold for determining whether or not a model should be the subject of further iterations of varying components.

In one embodiment, the density modeling logic generates density models according to an expectation maximization technique for estimating parameters of statistical models. The expectation maximization technique starts with initial parameter(s) of an initial model and iterates through a model generation process including an expectation step, a maximization step, and an assessment or evaluation step until a final density model has been assessed to be a satisfactory model for the data or until the model generation process fails to produce a significantly better model in the last iteration. In the expectation step, the density modeling logic determines a function that describes a likelihood or log likelihood (i.e., the natural logarithm of the likelihood) that current parameter(s) of the current model represent the data. In the maximization step, the density modeling logic chooses new parameter(s) for a new model, optionally reusing parameter(s) of the current model and optionally replacing parameter(s) of the current model.

In an assessment step, the density modeling logic determines how much better the new model represents the data or a sample of the data. The density modeling logic may avoid continuing with the new model if the new model does not represent the data at least a threshold amount better than the current model. If the density modeling logic avoids continuing with the new model, another new model may be proposed by choosing other new parameter(s), optionally reusing other parameter(s) of the current model, and optionally replacing other parameter(s) of the current model.

In one embodiment, the field grouping logic may use density model(s) to estimate how frequently field values should co-occur if they are independent. For example, a density model can learn both dependent and independent fields. Density modeling logic may generate a trivial model (such as a model with a single component) and compare the estimates to the raw data counts. If the estimates are good, then the fields may be estimated to be independent.

Interface for Creating Models

In one embodiment, a density modeling interface presents options for generating density models that represent sets of data. The options may be presented via an application programming interface or via a graphical display to a user. Generation of models by the density modeling logic may be triggered by a request or command that results from user or application input to the density modeling interface. In one embodiment, the density modeling interface causes construction of a SQL query to invoke a SQL table function that builds the density model.

In one embodiment, the input to the table function is a set of rows containing data mining attributes. The table function may also take as an input a cursor with settings that help guide the build process. Example settings include a number of components or a maximum number of correlated two-dimensional ("2D") attributes. Such inputs and settings may be specified by default or by user or application input to the density modeling interface.

Preparing Data for Modeling

In various embodiments, the density modeling logic may be hosted on a single machine that executes a set of sequential processes, or on multiple software instances on one or multiple machines that execute processes in parallel. For example, different software instances may process different portions of the data in parallel, or may perform different phases of processing on same sets of data in parallel. A first set of density modeling logic may perform a first set of processes on portions of the data, and these portions may be passed to a second set of density modeling logic as the processing is completed, portion by portion, by the first set of density modeling logic.

In one embodiment, in an initial data scan, the first set of density modeling logic, which may be distributed over a number of slaves, may record the minimum and maximum values observed for all numerical attributes (2D and nested) and computes the frequencies of the attribute name and value combinations of all categorical attributes (2D and nested). Multidimensional data such as two-dimensional ("2D") data, such as columns of a table, includes multiple variables and may be stored as an array, series or collection of data. For example, multidimensional data may be stored in a nested column where each row includes a collection of values such as (name, value) pairs.

The minimum and maximum numerical attributes values, categorical frequencies, and number of rows in the first set may be passed on to a second set of density modeling logic, which may be hosted on same or different devices as the first set. Data may be hashed in the second set, and the minimum and maximum numerical values and categorical frequencies are aggregated. The minimum and maximum values may be used to compute equi-width histograms in final cluster statistics. The aggregated categorical frequencies may be used to identify the top-N bins for each categorical attribute. In the process of aggregation, nested column attribute lists may also be consolidated.

Bin boundaries may be computed for each column. Columns with intrinsic order (e.g., NUMBER, DATE) may be handled by sorting the values and finding appropriate cut points. The bin boundaries may not be strictly quantile in the cases when the data distribution and/or the number of unique values do not allow precise quantization. Columns without intrinsic order (e.g., CHAR, NCHAR) may use top-N binning. Univariate column histograms may also produced in the bin boundary computation step.

In one embodiment, data is loaded by scanning a data table, binning the data on the fly, and storing the binned data in memory. The binned data may then be used to compute bivariate histograms for each column pair or to generate models. Attribute similarity computations may be made based on the univariate and bivariate histograms. For each pair of attributes, the observed bivariate histogram is compared to an estimate, using the corresponding univariate histograms, based on the assumption that the variables are independent. The pair-wise similarity estimates may then be used to produce a global attribute similarity ranking.

The second set of density modeling logic may communicate back, to the first set of density modeling logic, the minimum and maximum numerical values, the top-N categorical bins, the number of attributes per nested column, and the total number of rows in the data. The nested column attribute lists are stored in the second set. This information may be used during the model output stage. The nested attribute lists may be communicated back to the first set if there are too few nested attributes in a column to carry out meaningful projections. In this case, the nested attribute lists may be used to create consistent mappings of subnames (and values) to attribute ids.

Once the total number of rows is known, the first set of density modeling logic may draw a small random sample of the 2D data (for example, approximately 2000 rows). The sampling is repeatable in the presence of a user provided row identifier (case id). In the process of sampling, the 2D categorical columns are binned using the top-N bin definitions generated during the previous step.

In the second set of density modeling logic, the 2D data sample is used to perform attribute similarity analysis. During the attribute similarity analysis, the second set of density modeling logic may compute quantile bin boundaries for the numerical columns and/or univariate histograms for the data columns.

After binning the sample data, the density modeling logic computes bivariate histograms for each attribute pair and Kullback-Leibler divergence ("KLD") distances between the bivariate histograms and the distribution produced by the univariate histograms under an assumption that the univariate histograms are independent. The KLD score measures an amount of information that is lost when one field is used to approximate another field. In one embodiment, if the amount of lost information is below a threshold for two fields, then the fields may be grouped together as interdependent. On the other hand, if the amount of lost information is above a threshold for two fields, then the fields are not grouped together as interdependent. In another embodiment, the amount of lost information may be a factor in a distance function that accounts for one or more other factors. The distance function may be used to determine the distance between distributions, and fields may be grouped together if they are within a threshold distance of each other. Pair-wise KLD distances form a similarity matrix, and the density modeling logic may compute a rank-weighted similarity row average for each attribute. This quantity may be used as a measure of global similarity. In one embodiment, only attributes that are significantly correlated are used during a subsequent EM model build. The user can further restrict the attribute space to the N most correlated attributes according to a setting on the density modeling interface.

The data sample may help the density modeling logic determine what type of distribution is most appropriate for modeling each numerical column (Gaussian or multivalued Bernoulli on quantized data). Attributes, that are modeled using Gaussian distributions, may be normalized when automatic data preparation is turned on. The density modeling logic computes the required shift and scale normalization parameters on the sample.

The second set of density modeling logic may communicate to the first set of density modeling logic the computed normalization parameters and quantile bin boundaries. In one embodiment, only data preparation parameters that were found to be significantly correlated are passed back to the first set of density modeling logic. Passing a subset of the original attributes effectively filters the data. The second set of density modeling logic also send a list of the categorical 2D column ids that were found to be correlated.

The density modeling logic transforms the raw data by either binning or normalizing the correlated 2D columns. Nested columns with large number of attributes may be projected down to lower dimensional spaces. The first set of density modeling logic may use random projections to generate the transformations, optionally independently by each slave in the first set. The transformed data is then stored by the first set of density modeling logic, and the first set of density modeling logic may also randomly partition the data rows into build and held-aside sets if there are a sufficient number of rows. In one embodiment, the density modeling logic uses the last 25% of the records as a held-aside dataset.

Overview of Expectation Maximization

In one embodiment, the density modeling logic grows an expectation maximization model incrementally, starting with a single or a few components. Then, the density modeling logic adds one or a few components at a time and evaluates whether the larger model significantly outperforms the smaller model. New components are initialized to areas with poor distribution fit. The new model is retained only if it has a better held-aside log likelihood, i.e., if the data is better explained by the first model. If the data had too few rows to allow the creation of a held-aside dataset, the density modeling logic may use the Bayesian Information Criterion (BIC criterion) as a measure of quality. If the new model does not outperform the original model, the density modeling logic attempts adding a new component initialized to a different area with poor distribution fit. The search may continue until a sufficient number of failed attempts are made or the model reaches the maximum allowed number of components as specified by the user setting.

Expectation Maximization (EM) is an iterative algorithm that adjusts the model parameters to maximize the likelihood of the build data. The algorithm performs two steps: Expectation (E-step) and Maximization (M-step). The E-step computes probabilistic assignments to model components given the current model. The M-step optimizes the model parameters to improve the likelihood of the build data.

To learn the EM model parameters, the density modeling logic iteratively processes the input data. The data does not need to be randomized or presented in any particular order. Initially, separate models may be built for the group of 2D correlated columns and for each nested column.

Expectation maximization logic iterates over the E-step and the M-step until convergence. The E-step involves scoring each row against the current model, starting with seed components or parameters. The M-step involves computing optimized model parameters based on the E-step assignments. Each slave in the first set of density modeling logic may include expectation maximization logic for performing the E-step and a partial M-step on its set of build rows. The E-step results are also used to compute the log likelihood of the build data. The held-aside rows do not need to be processed and can be skipped at this stage.

After processing all build rows at the slaves, the partial M-step results and the log likelihood on the build data may be passed to the second set of density modeling logic, where the M-step results are aggregated to produce a global model of adjusted components or parameters. The aggregated log likelihood on the build data may be used to determine if the model parameters have stopped changing significantly and the algorithm has converged.

The second set of density modeling logic communicates the global model to the first set. If the algorithm has not converged, another iteration on the build data may be performed. Once the algorithm converges to adjusted components, a single E-step is performed on the held-aside data rows to compute the log likelihood for the held-aside data rows. For small datasets with no held-aside, the density modeling logic performs this step on the build data and then computes a BIC criterion on the log likelihood of the build data.

The partial log likelihoods on the held-aside data, computed by the first set of density modeling logic, are aggregated to produce the global log likelihood. This global likelihood may be used to determine if the current model has produced a significant improvement over the previous model.

Once the model build is completed, the density modeling logic may next produce attribute statistics for the records assigned to each of the adjusted components. These statistics may be used to generate cluster details for the model viewing stage. Generating these statistics may involve a pass through the transformed data to compute row assignments. Based on the row assignments, attribute statistics are collected from the corresponding rows in the raw data. In parallel execution, this work is performed locally in the first set of density modeling logic and then aggregated in the second set of density modeling logic.

Initial Models

The expectation maximization logic creates initial baseline models at each slave. The initial baseline models may be identical models with one or few component(s). For example, the Gaussian components may be initialized with the means and standard deviations computed from the sample, and the Bernoulli distributions may be initialized with bins of equal probability.

During this initial bootstrapping stage, a log likelihood (or BIC) reference point is created from the initial baseline models. Any more complex model should produce a better likelihood (BIC) than the simplistic one (or few) component(s) baseline.

The E-Step

In the E-step, expectation logic uses the current model parameters to compute probability assignments for each record to the model components. Formally the E-step is given by:

$$p(m \mid x_i, \theta) = \frac{p(m) * p(x_i \mid m, \theta)}{\sum_j p(j) p(x_i \mid j, \theta)}, \quad (1)$$

where m is the index of a model component, x is a data record, and θ is the set of model parameters.

The E-step essentially weighs the probability that the data record $x_i$ was generated by component m, $p(x_i \mid m, \theta)$, by the component prior p(m). This weighted probability is then normalized across all model components.

The computation of $p(x_i \mid m, \theta)$ depends on the types of distribution used to model individual data columns.

If independence is assumed among the attributes, the overall probability of a data record is given by the product of probabilities of individual attributes:

$p(x_i \mid m, \theta) = \pi_k p(x_{ik} \mid m, \theta)$, where k indexes the individual attributes.

The independence assumption holds for attributes modeled by multivalued Bernoulli distributions and Gaussian distributions with diagonal covariance matrices. In the case of multivalued Bernoulli distributions, $p(x_{ik} \mid m, \theta)$ is equal to the probability of the histogram bin that corresponds to the value in the data record.

In the case of Gaussian distributions with diagonal covariance matrices, $p(x_{ik} \mid m, \theta)$ is computed as:

$$p(x_{ik} \mid m, \theta) = \frac{1}{\sqrt{2\pi\sigma_{mk}^2}} \exp\left(-\frac{(x_{ik} - \mu_{mk})^2}{2\sigma_{mk}^2}\right),$$

where $\mu_{mk}$ and $\sigma_{mk}$ are the parameters of the Gaussian distribution of component m and attribute k.

To ensure stable numerical computations and prevent underflows, the probability product is computed as a sum on the log scale. This also avoids the computationally expensive exponentiation operations.

In the case of Gaussian distributions with full covariance matrices, correlations between attributes and $p(x_i \mid m, \theta)$ may be computed in one step as:

$$p(x_i \mid m, \theta) = \frac{1}{(2\pi)^{k/2} |\Sigma_m|^{1/2}} \exp\left(-\frac{1}{2}(x_i - \mu_m)' \sum_m^{-1} (x_i - \mu_m)\right),$$

where k is the number of attributes, m indexes the components, $\Sigma_m$ is the full covariance matrix of component m, $|\Sigma_m|$ is the determinant, $\Sigma_m^{-1}$ is the inversion, and $\mu_m$ is the mean vector of component m.

If the data has a mix of numerical and categorical attributes, the expectation logic may assume independence between the two groups. Accordingly, p(xi|m, θ) may be computed separately within each group, and the expectation logic may multiply the results to produce the final probability.

The M-Step

In the M-Step, maximization logic uses the expectation probabilities computed in the E-step to update the EM model parameters. Since the computations may be distributed across slaves, the maximization logic computes partial running sums that can be easily aggregated.

The maximization logic computes partial prior updates, $p(m)^s$ by summing the expectation probabilities for each model component over all data records. The superscript s indicates that the sums are within each slave and i indexes the rows within the slave.

$$p(m)^S = \Sigma_i p(m|x_i, \theta).$$

Updating a histogram bin value in a multivalued Bernoulli distribution includes summing the expectation probabilities over the data records that have that particular bin in the attribute described by the histogram.

$\beta_{mkn}^s = \Sigma_{i \in x(k)=n} p(m|x_i, \theta)$, where $\beta_{mkn}$ is the $n^{th}$ bin frequency of the $m^{th}$ component and $k^{th}$ attribute.

In one embodiment, two running sums are maintained to update the parameters of a Gaussian distribution with a diagonal covariance matrix, for each attribute, we maintain two running sums:

$$x_{mk}^s = \Sigma_i p(m|x_i, \theta) * x_{ik} \quad (2)$$

$(x^2_{mk})^s = \Sigma_i p(m|x_i, \theta) * x_{ik}^2$, where m indexes the components, k indexes the attributes, and $x_{ik}$ is the $k^{th}$ attribute value in the $i^{th}$ record.

Both means and the standard deviations may be computed using a single pass through the data using the second quantity.

To compute updates for the mean parameters of Gaussian distributions with full covariances, we maintain the running sum in equation (2).

The partial updates of the full covariance matrices include the computation of the following matrix of running sums:

$$\begin{bmatrix} (x_{m1}^2)^s & (x_{m1}x_{m2})^s & \ldots & (x_{m1}x_{mK})^s \\ (x_{m1}x_{m2})^s & (x_{m2}^2)^s & \ldots & (x_{m2}x_{mK})^s \\ \vdots & \vdots & \ddots & \vdots \\ (x_{mK}x_{m1})^s & (x_{mK}x_{m2})^s & \ldots & (x_{mK}^2)^s \end{bmatrix},$$

where m indexes the components, and K is the number of attributes modeled by the Gaussian distribution and an element of the matrix is given by:

$(x_{mk}x_{mn})^s = \Sigma_i p(m|x_i, \theta) * x_{ik} x_{in}$, where k and n index two different attributes.

Computing Partial Likelihoods

As the expectation maximization logic computes the E-step probabilities and M-step partial results, the expectation maximization logic also evaluates the log likelihood of the build data. The log likelihood is a summary statistic that quantifies how well the underlying data is modeled by the parametric EM model. The log likelihood is defined as:

$LL(\theta;x)^s = \Sigma_i p(x_i|\theta) = \Sigma_i \Sigma_m \ln(p(m)*p(x_i|m,\theta))$, where i indexes the data rows, m indexes the components, and p(m) is the current model prior. (3)

Monitoring the value of the log likelihood statistic provides one of EM's convergence criteria—if the log likelihood does not significantly improve over an iteration, the algorithm exits the E-step/M-step iterative loop.

Held-aside data does not get processed during the primary E-step and M-step iterations. However, once convergence is achieved, a single E-step through is performed on the held-aside data to compute the log likelihood of the held-aside data. This value is used to independently evaluate the new model quality and prevent overfitting. The computation in equation (3) is used to compute the log likelihood, and the summation goes over the held-aside rows.

In one embodiment, when the expectation maximization logic uses a held-aside validation set to monitor model improvement and when a unique identifier is not available for rows of the binned data, the rows may be hashed to achieve a pseudo-random data split into training and validation data. In one embodiment, the density modeling logic uses a two-level hashing approach. The first level randomly partitions the data in half. One of the halves is passed through a second hash to split it further into two parts. This results in a training set and a validation set split.

Special treatment may be given to repeated rows in the data. The described two-level hashing may place all identical rows in the same partition. To avoid that scenario, the density modeling logic may keep track of the hash collisions and alternate the partition assignment. A hash table may be maintained for each hash function. The key is the hashed value. To keep track of collisions, the density modeling logic stores an assignment value (0 for training set and 1 for validation set). When a collision occurs, the density modeling logic looks up the last assignment, assigns the row to the other partition, and updates the last assignment value. This results in a random partition of the identical rows between the training and the validation sets.

Finally, the density modeling logic may re-order the 2D pointers to the individual rows in the build data, so that the first of the rows represent the training data and the last of the rows represents the validation data.

When held-aside data does not exist, the expectation maximization logic uses the build data instead. The build data log likelihood may be converted in a BIC score.

The expectation maximization logic also quantifies the contribution of individual components to the global log likelihood. This measure allows the density modeling logic to grow the model in areas of poor fit. The partial contributions of the individual components $Q_m$ are given by:

$$Q_m^s = \Sigma_i p(m) * p(x_i|m,\theta)) * p(m|x_i,\theta) \quad (4)$$

The expectation maximization logic may output the following types of information: partial prior updates; partial multivalued Bernoulli histogram updates; partial Gaussian mean updates; partial Gaussian covariance updates; and partial log likelihood statistics.

Adding Model Components

In one embodiment, density modeling logic aggregates the partial parameter updates and log likelihoods computed by the slaves and guides the EM model search. Guiding the EM model search may include monitoring convergence conditions, evaluating model quality, and adding or rejecting new model components.

A parameter aggregation step may follow each E-step/M-step iteration. In the parameter aggregation step, the sum of partial priors $p(m)^s$ aggregated across priors may be scaled by the total number of records N.

$$p(m) = \Sigma_s p(m)^s / N.$$

The sum of partial bin frequencies $\beta_{mkn}^s$ is scaled by the product of the total number of records and the newly computed component prior.

$$\beta_{mkn} = \Sigma_s \beta_{mkn}^s / (N * p(m)).$$

To avoid ordering the sequence of aggregation, the density modeling logic may initially compute the summation (numerator). Once all aggregations are complete, the density modeling logic may divide by the denominator.

The same staged computation may apply to the Gaussian mean and covariance aggregations.

For Gaussian means, the sum of partial bin frequencies $x_{mk}^s$ is scaled by the product of the total number of records and the newly computed component prior.

$$\mu_{mk} = \Sigma_s x_{mk}^s / (N*p(m))$$

The Gaussian covariance parameters may be computed as:

$$\sigma_{mkn}^2 = \sum_s \frac{(x_{mk}*x_{mn})^s}{N*p(m)} - \mu_{mk}*\mu_{mn},$$

where $(x_{mk}*x_{mn})^s$ is the sum of partial covariances aggregated across slaves and $\mu_{mk}$ and $\mu_{mn}$ are the newly computed means for attributes k and n in component m.

The partial log likelihood sums may be aggregated across slaves. If the change in log likelihood from the previous E-step/M-step iteration is less than 0.001% or some other threshold value, the algorithm has converged. If the number of iterations has exceeded the maximum number of allowed iterations, the algorithm also terminates. If neither convergence criterion has been met, a new E-step/M-step may be initiated.

The EM model may be grown incrementally by adding one or a few component(s) at a time and training the model using the primary EM algorithm. After the algorithm has converged, density modeling logic evaluates if the larger model significantly outperforms the original model. The density modeling logic may keep adding components until either the EM model stops showing improvement or the maximum number of components is reached. The density modeling logic adds new components in areas with poor distribution fit.

The density modeling logic may replace a component with poor fit by two new components. The new components are initialized with the parent distributions with slight perturbation to break the symmetry.

In one embodiment, the density modeling logic monitors the improvement in log likelihood on the held-aside dataset, and the density modeling logic may accept a new model component only if the density modeling logic detects a reasonable improvement in log likelihood. In one embodiment, the improvement must be greater than a threshold value such as 0.1%.

When there are too few rows to perform a split, such as 500 or fewer rows, the density modeling logic may use BIC regularization to penalize the increase in model size:

BIC=−2*LL*k*ln(N), where k is the number of model parameters, and N is the number of rows. A lower BIC value indicates a better model.

In one embodiment, the density modeling logic chooses which component to split into two new components based on its individual contribution to the log likelihood $Q_m$ (see equation 4). The component with smallest contribution may be used for the split. If the top choice does not produce an improvement, the next component on the list may be used for splitting. Each component may be visited only once, and components where the split failed are marked as non-splittable. The search for a better model may be limited to a threshold number of bad splits, such as 5, after which the model search terminates.

To facilitate reversal of bad splits, the density modeling logic stores a copy of the previous model. If the new model does not produce an improvement, the new model is discarded and the previous model is restored.

The stored model size may be determined by the number of components (n), number of attributes (m), and the number of bins (k). The attributes can be subdivided into three groups: attributes using multivalued Bernoulli distributions ($m_b$), attributes using Gaussian distributions with diagonal covariance matrices ($m_{gd}$), and attributes using Gaussian distributions with full covariance matrices attributes ($m_{gf}$). The total model size may involve the storage of $n*(1+m_b*k+2*m_{gd}+m_{gf}+m_{gf}*(m_{gf}+1)/2)$ double precision values.

Once the model search is complete, the final or resulting model may be distributed to the slaves, stored, or returned in response to a request for a resulting model for the underlying dataset. The output of this stage is an EM model. This model is either the result of aggregation of the partial M-step parameter updates or is a model with a newly split component.

Storage and Use of the Resulting Model

The resulting model may be stored in association with a data set that the model represents. If the data is distributed among multiple devices, the resulting model may be distributed to the multiple devices for use at any of the devices. The distributed devices may use the resulting model to make predictions about the set of data without requiring a scan or analysis of individual records in the set of data.

Analysis of the set of data using the resulting model may include estimating how many rows will be eliminated by predicate(s) in a query, and/or how many rows will be fetched by a query after the application of the predicate(s).

The resulting model may also be used to create visualizations of data clusters. Because the resulting model approximates value distributions in the underlying data, the peaks and other clusters of data in the resulting model are likely to correspond with clusters of data in the underlying dataset.

The resulting model may be used in any situation that would otherwise require access to the underlying dataset, except in circumstances where exact determinations need to be made about the underlying dataset. The resulting model will often consume significantly less space to store and significantly less processor time and memory to analyze because the resulting model is merely a function that represents the underlying data and does not include the underlying data itself.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
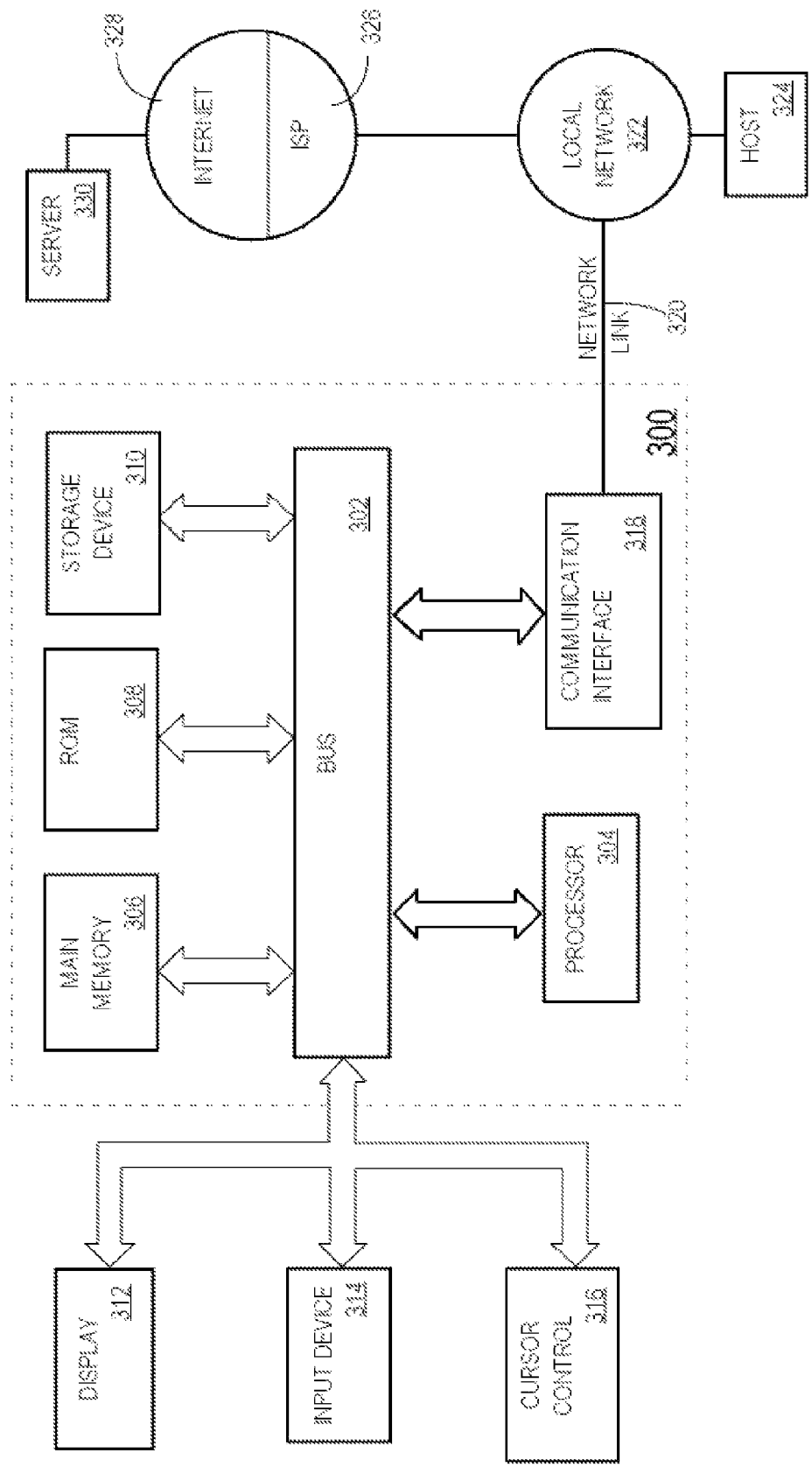
FIG. 3 illustrates an example computer system for performing various techniques described herein, such as the example process of FIG. 2.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

As used herein, the terms "first," "second," "third," "fourth," and "particular" are naming conventions that are used to introduce and reference members of a set of items.

Unless otherwise expressly indicated, these terms are not intended to provide any ordering information about the members in the set. For example, a "first" item may or may not be at a beginning of a set of items, and may or may not be before a "second" item in the set, even if the set is referred to as a "list" or some other ordered arrangement of items.

To the extent that any steps are provided herein, an order that the steps are written is not necessarily an order that the steps are performed unless a later listed step is actually dependent on an earlier listed step or unless a particular ordering is expressly required. For example, a later listed step that uses or stores A may be dependent on an earlier listed step that receives or generates A but not necessarily on another earlier listed step that also uses or stores A. Therefore, the later listed step may be performed after one of the earlier listed steps but not necessarily after both of the earlier listed steps.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   generating a first density model that approximates value densities in a set of data, wherein the first density model comprises a first set of functional components;
   iteratively generating at least one additional density model comprising a second density model, wherein generating the second density model comprises:
   selecting a first functional component of the first set of functional components based at least in part on how much the first functional component contributes to how well the first set of functional components approximates the value densities in the set of data,
   generating a variation of the first functional component, and
   generating the second density model comprising a second set of functional components, wherein the second set of functional components includes at least one more functional component than the first set of functional components, and wherein the second set of functional components is determined using at least the first functional component and the variation of the first functional component as seed components;
   storing, in association with the set of data, a resulting density model selected from the at least one additional density model;
   wherein the method is performed by one or more computing devices.

2. The method of claim 1, wherein iteratively generating the at least one additional density model further comprises:
   determining an amount of improvement that indicates how much better the second density model approximates the value densities in the set of data than the first density model approximates the value densities in the set of data;
   based at least in part on determining that the amount of improvement does not satisfy a threshold amount of improvement:
   selecting a second functional component of the first set of functional components, wherein the second functional component is different than the first functional component; and
   generating a third density model comprising a third set of functional components, wherein the third set of functional components includes at least one more functional component than the first set of functional components, and wherein the third set of functional components is determined using at least the second functional component and a variation of the second functional component as seed components;
   wherein the at least one additional density model comprises the third density model.

3. The method of claim 1, wherein iteratively generating the at least one additional density model further comprises:
   determining an amount of improvement that indicates how much better the second density model approximates the value densities in the set of data than the first density model approximates the value densities in the set of data;
   based at least in part on determining that the amount of improvement does not satisfy a threshold amount of improvement, stop iteratively generating the at least one additional density model.

4. The method of claim 1, wherein iteratively generating the at least one additional density model further comprises:
   determining an amount of improvement that indicates how much better the second density model approximates the value densities in the set of data than the first density model approximates the value densities in the set of data;
   based at least in part on determining that the amount of improvement satisfies a threshold amount of improvement:
   selecting a second functional component of the second set of functional components based at least in part on how much the second functional component contributes to how well the second set of functional components approximates the value densities in the set of data; and
   generating a third density model comprising a third set of functional components, wherein the third set of functional components includes at least one more functional component than the second set of functional components, and wherein the third set of functional components is determined using at least the second functional component and a variation of the second functional component as seed components;
   wherein the at least one additional density model comprises the third density model.

5. The method of claim 1, wherein iteratively generating the at least one additional density model further comprises:
   determining whether a number of components in the second density model is a threshold number of components allowed for the resulting density model;
   based at least in part on determining that the number of components in the second density model is less than the threshold number of components:
   selecting a second functional component of the second set of functional components based at least in part on how much the second functional component contributes to how well the second set of functional components approximates the value densities in the set of data; and generating a third density model comprising a third set of functional components, wherein the third set of functional components includes at least one more functional component than the first set of functional components, and wherein the third set of functional components is determined using at least the second functional component and a variation of the second functional component as seed components;

wherein the at least one additional density model comprises the third density model.

6. The method of claim 1, wherein iteratively generating the at least one additional density model further comprises:
determining whether a number of components in the second density model is a threshold number of components allowed for the resulting density model;
based at least in part on determining that the number of components in the second density model meets the threshold number of components, stop iteratively generating the at least one additional density model.

7. The method of claim 1, further comprising:
determining a degree of accuracy or relative degree of improvement by which the second density model approximates the value densities in the set of data;
wherein storing the resulting density model comprises storing the second density model based at least in part on determining that the degree of accuracy or relative degree of improvement satisfies a threshold.

8. The method of claim 1, wherein the seed components also include one or more other components in a neighborhood of the first functional component, and wherein determining the second set of functional components comprises determining adjusted functional components of the second density model by determining, in an expectation step, how much the seed components contribute to how well the second density model approximates value distributions, and, in a maximization step, updated seed components based at least in part on how much of at least part of the set of data is attributable to the seed components.

9. The method of claim 1, wherein determining the second set of functional components using at least the first functional component and the variation of the first functional component as seed components comprises determining adjusted functional components of the second density model by determining, in an expectation step, how much the seed components contribute to how well the second density model approximates value distributions, and, in a maximization step, updated seed components based at least in part on how much of at least part of the set of data is attributable to the seed components.

10. The method of claim 1, wherein the set of data comprises a binned representation of a raw set of data that comprises non-numerical values.

11. The method of claim 1, wherein the first functional component is a Gaussian distribution centered at a specified value, and wherein the variation of the first functional component is generated by varying a location parameter of the first functional component in a direction of maximum variance.

12. The method of claim 1, wherein the first functional component is a multinomial distribution comprising one or more frequencies, and wherein the variation of the first functional component is generated by varying the one or more frequencies of the multinomial distribution.

13. The method of claim 1, wherein how well the first set of functional components approximates the value densities in the set of data is measured based at least in part on a likelihood that at least part of the set of data is explained by the first set of functional components.

14. One or more non-transitory storage media storing instructions which, when executed by one or more computing devices, cause:
generating a first density model that approximates value densities in a set of data, wherein the first density model comprises a first set of functional components;
iteratively generating at least one additional density model comprising a second density model, wherein generating the second density model comprises:
selecting a first functional component of the first set of functional components based at least in part on how much the first functional component contributes to how well the first set of functional components approximates the value densities in the set of data,
generating a variation of the first functional component, and
generating a second density model comprising a second set of functional components, wherein the second set of functional components includes at least one more functional component than the first set of functional components, and wherein the second set of functional components is determined using at least the first functional component and the variation of the first functional component as seed components;
storing, in association with the set of data, a resulting density model selected from the at least one additional density model.

15. The one or more non-transitory storage media of claim 14, wherein iteratively generating the at least one additional density model further comprises:
determining an amount of improvement that indicates how much better the second density model approximates the value densities in the set of data than the first density model approximates the value densities in the set of data;
based at least in part on determining that the amount of improvement does not satisfy a threshold amount of improvement:
selecting a second functional component of the first set of functional components, wherein the second functional component is different than the first functional component; and
generating a third density model comprising a third set of functional components, wherein the third set of functional components includes at least one more functional component than the first set of functional components, and wherein the third set of functional components is determined using at least the second functional component and a variation of the second functional component as seed components;
wherein the at least one additional density model comprises the third density model.

16. The one or more non-transitory storage media of claim 14, wherein iteratively generating the at least one additional density model further comprises:
determining an amount of improvement that indicates how much better the second density model approximates the value densities in the set of data than the first density model approximates the value densities in the set of data;
based at least in part on determining that the amount of improvement does not satisfy a threshold amount of improvement, stop iteratively generating the at least one additional density model.

17. The one or more non-transitory storage media of claim 14, wherein iteratively generating the at least one additional density model further comprises:
  determining an amount of improvement that indicates how much better the second density model approximates the value densities in the set of data than the first density model approximates the value densities in the set of data;
  based at least in part on determining that the amount of improvement satisfies a threshold amount of improvement:
    selecting a second functional component of the second set of functional components based at least in part on how much the second functional component contributes to how well the second set of functional components approximates the value densities in the set of data; and
    generating a third density model comprising a third set of functional components, wherein the third set of functional components includes at least one more functional component than the second set of functional components, and wherein the third set of functional components is determined using at least the second functional component and a variation of the second functional component as seed components;
  wherein the at least one additional density model comprises the third density model.

18. The one or more non-transitory storage media of claim 14, wherein iteratively generating the at least one additional density model further comprises:
  determining whether a number of components in the second density model is a threshold number of components allowed for the resulting density model;
  based at least in part on determining that the number of components in the second density model is less than the threshold number of components:
    selecting a second functional component of the second set of functional components based at least in part on how much the second functional component contributes to how well the second set of functional components approximates the value densities in the set of data; and
    generating a third density model comprising a third set of functional components, wherein the third set of functional components includes at least one more functional component than the first set of functional components, and wherein the third set of functional components is determined using at least the second functional component and a variation of the second functional component as seed components;
  wherein the at least one additional density model comprises the third density model.

19. The one or more non-transitory storage media of claim 14, wherein iteratively generating the at least one additional density model further comprises:
  determining whether a number of components in the second density model is a threshold number of components allowed for the resulting density model;
  based at least in part on determining that the number of components in the second density model meets the threshold number of components, stop iteratively generating the at least one additional density model.

20. The one or more non-transitory storage media of claim 14, wherein the instructions, when executed, further cause:
  determining a degree of accuracy or relative degree of improvement by which the second density model approximates the value densities in the set of data;
  wherein storing the resulting density model comprises storing the second density model based at least in part on determining that the degree of accuracy or relative degree of improvement satisfies a threshold.

21. The one or more non-transitory storage media of claim 14, wherein the seed components also include one or more other components in a neighborhood of the first functional component, and wherein determining the second set of functional components comprises determining adjusted functional components of the second density model by determining, in an expectation step, how much the seed components contribute to how well the second density model approximates value distributions, and, in a maximization step, updated seed components based at least in part on how much of at least part of the set of data is attributable to the seed components.

22. The one or more non-transitory storage media of claim 14, wherein determining the second set of functional components using at least the first functional component and the variation of the first functional component as seed components comprises determining adjusted functional components of the second density model by determining, in an expectation step, how much the seed components contribute to how well the second density model approximates value distributions, and, in a maximization step, updated seed components based at least in part on how much of at least part of the set of data is attributable to the seed components.

23. The one or more non-transitory storage media of claim 14, wherein the set of data comprises a binned representation of a raw set of data that comprises non-numerical values.

24. The one or more non-transitory storage media of claim 14, wherein the first functional component is a Gaussian distribution centered at a specified value, and wherein the variation of the first functional component is generated by varying a location parameter of the first functional component in a direction of maximum variance.

25. The one or more non-transitory storage media of claim 14, wherein the first functional component is a multinomial distribution comprising one or more frequencies, and wherein the variation of the first functional component is generated by varying the one or more frequencies of the multinomial distribution.

26. The one or more non-transitory storage media of claim 14, wherein how well the first set of functional components approximates the value densities in the set of data is measured based at least in part on a likelihood that at least part of the set of data is explained by the first set of functional components.

* * * * *